(12) United States Patent
Inomata

(10) Patent No.: US 7,674,529 B2
(45) Date of Patent: Mar. 9, 2010

(54) FUNCTIONAL GROUP-INTRODUCED POLYAMIDE SOLID PHASE

(75) Inventor: Hiroko Inomata, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1029 days.

(21) Appl. No.: 11/311,340

(22) Filed: Dec. 20, 2005

(65) Prior Publication Data
US 2006/0135707 A1 Jun. 22, 2006

(30) Foreign Application Priority Data
Dec. 22, 2004 (JP) .......................... P2004-371741

(51) Int. Cl.
C08L 75/00 (2006.01)
B32B 27/08 (2006.01)
B32B 27/34 (2006.01)

(52) U.S. Cl. .................. 428/474.4; 428/423.1; 525/424

(58) Field of Classification Search ............. 428/423.1, 428/474.4; 525/424
See application file for complete search history.

(56) References Cited

U.S. PATENT DOCUMENTS 5,252,375 A * 10/1993 Turbak et al. ................. 428/96
5,807,942 A    9/1998 Sakaki et al.

2001/0055762 A1  12/2001 Suzuki et al.

FOREIGN PATENT DOCUMENTS

| JP | 8-325393 A | 12/1996 |
| JP | 9-54092 A | 2/1997 |
| JP | 11-332595 A | 12/1999 |
| JP | 2000-146971 A | 5/2000 |

OTHER PUBLICATIONS

Lamture et al., Nucleic Acids Research, Oxford University Press, 1994, Vol. 22, No. 11, pp. 2121-2125.
MacBeath et al., Science, Sep. 8, 2000, Vol. 289, pp. 1760-1763.
Atifi et al., BioTechniques 2002, vol. 33 No. 3, pp. 612-618.
Zhang et al., Nucleic Acids Research, Oxford University Press, 1991, vol. 19, No. 14, pp. 3929-3933.

* cited by examiner

*Primary Examiner*—Ana L Woodward
(74) *Attorney, Agent, or Firm*—Birch, Stewart, Kolasch & Birch, LLP

(57) ABSTRACT

A functional group-introduced polyamide solid phase comprising: a polyamide solid phase having an amido group; and an isocyanate compound having an isocyanate group and a functional group, wherein the functional group of the isocyanate compound is introduced onto a surface of the polyamide solid phase by reacting the amido group of the polyamide solid phase with the isocyanate group of the isocyanate compound.

3 Claims, No Drawings

FUNCTIONAL GROUP-INTRODUCED POLYAMIDE SOLID PHASE

BACKGROUND OF THE INVENTION

1. Field of the Invention

The present invention relates to a polyamide solid phase having introduced onto the surface thereof a functional group capable of immobilizing a biochemical substance, and to a polyamide solid phase having immobilized thereto a biochemical substance.

2. Description of the Related Art

In recent years, techniques for effectively analyzing gene functions of various organisms have rapidly advanced. In order to analyze base sequence of DNA or DNA fragment to be used in the techniques, a detecting tool, called DNA chip, has been used which comprises a solid phase substrate having immobilized on the surface thereof many nucleotide derivatives such as DNA's, DNA fragments or synthetic oligonucleotides as detecting molecules. Such detecting molecules bound and immobilized onto the solid phase substrate are also called probe molecules. A typical DNA chip is a microarray comprising a solid-phase carrier such as a glass plate having many probe molecules arrayed and immobilized thereon.

The DNA chip has made it possible to effectively examine expression, variation and polymorphism of a gene in a short time. Preparation of the DNA chip, however, requires a technology for arraying many DNA fragments or oligonucleotides with a high density and a high stability on the surface of the solid-phase substrate.

In the case where the probe molecule to be immobilized is a synthetic oilgonucleotide, there has been known a technique of immobilizing the oligonucleotide onto the surface of a solid-phase substrate by first synthesizing an oligonucleotide having introduced thereonto a reactive group, separately previously surface-treating the surface of the solid-phase substrate so as to render it reactive with the reactive group to form a bond with the oligonucleotide, and spotting the oligonucleotide to form a covalent bond. For example, there has been known a technique of reacting an amino group-introduced oligonucleotide with a slide glass plate having introduced on the surface thereof an amino group via PDC (p-phenylenediisothiocyanate). However, this technique involves the problem that the reaction between PDC and the amino group-introduced oligonucleotide is slow. There has also been a technique of reacting an aldehydo group-introduced oligonucleotide with a slide glass having introduced onto the surface thereof an amino group. However, this technique involves the problem that stability of a reaction product of a Schiff base is so small that there tends to arise hydrolysis.

In recent years, it has also been proposed to use an oligonucleotide analogue, called PNA (peptide nucleic acid), as a probe molecule of a DNA chip in place of an oligonucleotide or polynucleotide (including DNA, DNA fragment, synthesized oligonucleotide or polynucleotide, RNA molecule and RNA fragment). As a measurement chip wherein this PNA is immobilized onto a solid-phase substrate through a covalent bond, it has been proposed to utilize a surface plasmon resonance (SPR) biosensor, use as a solid-phase substrate a transparent substrate having provided thereon a metal film and an organic substance layer comprising a silane coupling agent, immobilize avidin onto the organic substance layer, and immobilize PNA labeled with biotin to avidin (JP-A-11-332595). A DNA fragment bound and immobilized onto the surface of this measurement chip through the probe molecule of PNA by hybridization is detected utilizing the surface plasmon resonance phenomenon.

It has also been known to use a charge-coupled device (CCD) as a substrate of a DNA chip (Nucleic Acids Research, 1994, Vol. 22, No. 11, 2121-2125).

As a protein microarray, a report has been made by Schreiber, et al. which relates to a protein microarray for conducting analysis of mutual action between proteins with a high throughput (Science, 289, 1760-1763, 2000). This is a technique of spotting a protein aqueous solution on a slide glass having aldehydo group and blocking with a BSA solution. The thus-obtained microarray is reacted with a protein solution, followed by detecting using a fluorescence scanner. The microarray obtained by this technique involves the problem that stability of a Schiff base of a reaction product between the aldehydo group the substrate has and the amino group the protein has is so low that its hydrolysis is liable to take place.

In the field of detecting nucleic acids, in the case of using a polyamide film as a solid-phase substrate, immobilization has been conducted by spotting a nucleic acid onto the polyamide film and irradiating with UV rays (BioTechniques 2002, Vol. 33, No. 3, 612-618). This technique involves the problem that it requires a UV apparatus which permits to adjust energy.

Also, there is an example wherein a carboxyl group is introduced onto a polyamide film which is comparatively easily obtainable, and an oligonucleotide is immobilized thereto with a carbodiimide (Nucleic Acids Research, 1991, Vol. 19, No. 14, 3929-3933). However, this technique involves the problem that the polyamide film onto which a carboxyl group has previously been introduced is difficult to obtain.

As a technique for modifying a polyamide film with an isocyanate compound, there has been described a technique of modifying an aromatic polyamide for use as a protective film for glass-made products or as a magnetic tape with a polyisocyanate (JP-A-08-325393).

SUMMARY OF THE INVENTION

As has been described hereinbefore, related art has failed to prepare a chip for detecting DNA or protein rapidly with an excellent stability. Also, a special substrate such as a substrate for surface plasmon resonance biosensor or a CCD has been required as a substrate, or UV ray irradiation is required for immobilizing a probe, thus a specific apparatus being required in the steps for preparing the chip.

An object of the invention is to obtain a polyamide solid phase which uses an easily available polyamide solid phase as a substrate and which enables one to rapidly prepare a biological material chip and a microarray such as a DNA chip or a protein chip having an excellent stability.

Another object of the invention is to obtain a polyamide solid phase onto which a functional group for binding a biological material such as an oligonucleotide or a protein to the substrate is introduced and to obtain a solid phase onto which a biological material is immobilized.

As a result of extensive investigations to solve the above-mentioned problems, the inventors have found that a functional group can be introduced onto a polyamide solid phase by reacting the polyamide solid phase with an isocyanate compound having the functional group, i.e., by reacting the amido group existing on the polyamide solid phase with —N=C=O (isocyanate group) which the isocyanate compound has, and have found that the functional group serves to rapidly and stably immobilize a biological material to the polyamide solid phase through the functional group. The invention has been completed based on these findings.

That is, the above-mentioned objects can be attained by the invention having the following constitution.

(1) A functional group-introduced polyamide solid phase comprising:

a polyamide solid phase having an amido group; and an isocyanate compound having an isocyanate group and a functional group, wherein the functional group of the isocyanate compound is introduced onto a surface of the polyamide solid phase by reacting the amido group of the polyamide solid phase with the isocyanate group of the isocyanate compound.

(2) The functional group-introduced polyamide solid phase as described in (1) above, wherein the isocyanate compound is a compound represented by formula (I):

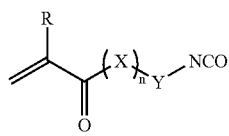

Formula (I)

wherein R represents a hydrogen atom or a methyl group;

X represents an oxygen atom or —NH—;

Y represents an optionally branched alkylene group containing from 1 to 6 carbon atoms; and n represents an integer of 0 or 1.

(3) The functional group-introduced polyamide solid phase as described in (2) above, wherein R represents a methyl group;

X represents an oxygen atom;

Y represents an ethylene group; and n represents 1.

(4) A functional group-introduced polyamide solid phase onto which a substance capable of forming a biochemical specific bond is immobilized by reacting a functional group of a functional group-introduced polyamide solid phase as described in any of (1) to (3) above with the substance capable of forming a biochemical specific bond.

(5) The functional group-introduced polyamide solid phase as described in (4) above, wherein the substance capable of forming a biochemical specific bond is a nucleic acid.

(6) The functional group-introduced polyamide solid phase as described in (5) above, wherein the nucleic acid is a nucleotide derivative, a peptide nucleic acid or LNA.

(7) The functional group-introduced polyamide solid phase as described in (4) above, wherein the substance capable of forming a biochemical specific bond is a protein.

(8) The functional group-introduced polyamide solid phase as described in (7) above, wherein the protein is an antigen or an antibody.

(9) The functional group-introduced polyamide solid phase as described in (7) above, wherein the protein is an avidin.

(10) The functional group-introduced polyamide solid phase as described in any of (1) to (9) above, wherein the polyamide solid phase is in a film form.

DETAILED DESCRIPTION OF THE INVENTION

Polyamide Solid Phase

In the invention, shape of the polyamide solid phase is not limited, and may be particulate-like, filament-like, hollow yarn-like or film-like. In the invention, other solid phase coated with polyamide may also be used as the polyamide solid phase. Of these, film-like polyamide solid phase is preferably used. In this case, the film thickness is preferably from 20 μm to 1,000 μm. Hereinafter, such film-like polyamide solid phase is referred to as a polyamide film. As the polyamide film, a porous one is preferred. A porous polyamide film is commercially available, thus being easily available. The porous polyamide film is advantageous in that, since it has a large surface area due to it porous structure, density of the functional group to be introduced by the isocyanate compound can be increased. This serves to increase, after immobilization, density of the substance capable of forming a biochemical specific bond, whereby sensitivity of detection can be enhanced in comparison with the case of immobilizing onto a flat surface, thus being preferred. Also, it is possible to cause a flow within the pores to forcibly conduct diffusion or migration of a substance to be reacted, which makes it possible to accelerate the reaction, thus such porous film being preferred.

Hereinafter, descriptions are made by reference to a polyamide film which is a preferred shape. However, the same applies to polyamide solid phase of other shape.

Polyamide Film

Structure of polyamide monomer in the polyamide film is not particularly limited. Examples of polyamide include 6-nylon and 6,6-nylon. Molecular weight of the polyamide is not particularly limited, either.

In the invention, there are various embodiments as to introduction of a functional group onto the polyamide film by reacting the polyamide film with the isocyanate compound.

Isocyanate Compound Having a Functional Group

The isocyanate compound to be used in the invention has a functional group. The functional group is not particularly limited as long as it can immobilize a substance capable of forming a biochemical specific bond.

Examples of such functional group include an α,β-unsaturated carbonyl group represented by a methacryloyl group and an acryloyl group, an α-haloalkylphenyl group which is not limited as to substitution position, an α-haloalkylcarbonyl group, a 1-(α-haloalkyl)vinyl group and a 2-(α-haloalkyl) vinyl group, with a methacryloyl group or an acryloyl group being particularly preferred.

As the isocyanate compound having a functional group to be used in the invention, those compounds which are represented by the following formula (1) are preferred.

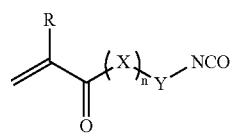

Formula (I)

wherein R represents a hydrogen atom or a methyl group, X represents an oxygen atom or —NH—, Y represents an optionally branched alkylene group containing from 1 to 6 carbon atoms, and n represents an integer of 0 or 1.

Specific examples thereof include 2-methacryloyloxyethyl isocyanate, 3-methacryloyloxypropyl isocyanate, 4-methacryloyloxybutyl isocyanate, 5-methacryloyloxypentyl isocyanate, 6-methacryloyloxyhexyl isocyanate, 2-oxo-3-methyl-3-butenyl isocyanate, 3-oxo-4-methyl-4-pentenyl isocyanate, 4-oxo-5-methyl-5-hexenyl isocyanate, 2-acryloyloxyethyl isocyanate, 3-acryloyloxypropyl isocyanate, 4-acryloyloxybutyl isocyanate, 5-acryloyloxypentyl isocyanate, 6-acryloyloxyhexyl isocyanate, 2-oxo-3-butenyl isocyanate and 3-oxo-4-pentenyl isocyanate, 4-oxo-5-hexenyl isocyanate. Of these, 2-methacryloyloxyethyl isocyanate is particularly preferred. That is, particularly preferably, R in the formula (1) represents a methyl group, X represents an oxygen atom, Y represents an ethylene group and n represents 1.

The above-described structure of the isocyanate compound to be used for introducing a functional group onto the polyamide solid phase serves to more rapidly introduce the functional group onto the polyamide solid phase, thus being preferred. Further, the polyamide solid phase onto which the functional group is introduced can react and bind with a substance capable of forming a biochemical specific bond to be described hereinafter to thereby more stably immobilize the substance capable of forming a biochemical specific bond, thus being preferred.

The amount of the isocyanate compound based on the polyamide film upon reaction between the polyamide film and the isocyanate compound is not particularly limited, but 0.1 to 100 μmol per $cm^2$ of the polyamide is preferred, with 1 to 10 μmol being more preferred.

The solvent to be used upon acting the isocyanate compound on the polyamide film is not particularly limited as long as it is inert to the isocyanate compound. Examples of such solvent include hexane, heptane, octane, toluene, xylene, acetone, methyl ethyl ketone, methyl isobutyl ketone, ethyl acetate, propyl acetate, butyl acetate, pentyl acetate, diethyl ether, diisopropyl ether, tetrahydrofuran, 1,4-dioxane, 1,2-dimethoxyethane, 1,2-diethoxyethane, di(2-methoxyethyl) ether, di(2-ethoxyethyl) ether, N,N-dimethylformamide, N,N-dimethylacetamide and N-methylpyrrolidone. Of these, tetrahydrofuran is particularly preferred. The amount of the solvent is not particularly limited, and is preferably an enough amount for the polyamide film to dip therein.

The temperature upon reaction between the polyamide film and the isocyanate compound is preferably from 10 to 150° C., more preferably from 20 to 60° C.

The reaction time upon reaction between the polyamide film and the isocyanate compound is preferably from 1 to 2 days, more preferably from 4 to 17 hours.

The amount of the functional group introduced onto the polyamide film can be determined by determining the amount of the isocyanate compound remaining in the solvent after acting the isocyanate compound on the polyamide film through an analyzing method such as gas chromatography or liquid chromatography.

In the invention, there are various embodiments as to immobilization of a substance capable of forming a biochemical specific bond onto the polyamide film by reacting the functional group having been introduced onto the polyamide film with the substance.

The term "biochemical specific bond" as used herein means to include, for example, hybridization with a complementary chain of a nucleotide chain, bond between a protein and a ligand, bond formed by antigen-antibody reaction and avidin-biotin bond and, in view of the force acting therebetween, hydrogen bond, bond by intermolecular force, electrostatic bond and hydrophobic bond.

The substance capable of forming a biochemical specific bond is not particularly limited, and is exemplified by nucleic acids and proteins. As the nucleic acids, nucleotide derivatives, peptide nucleic acids and LNA (Locked Nucleic Acid) are preferred. As the proteins, antigens, antibodies and avidins are preferred.

It is preferred for the substance capable of forming a biochemical specific bond to have previously formed therein or introduced thereinto afterwards a functional group capable of reacting with the functional group capable of immobilizing the substance such as a methacryloyl group or an acryloyl group to thereby form a covalent bond as an end group on the side opposite to the side where a biological specific bond is to be formed. The functional group which the substance capable of forming a biochemical specific bond has previously formed therein or introduced thereinto afterwards is not particularly limited, and is preferably an amino group, an imino group, a hydrazine group, a carbamoyl group, a hydrazinocarbonyl group, a carboximide group or a mercapto group, with an amino group being particularly preferred.

Existence or introduction of such functional group enables one to more rapidly react and bind the substance capable of forming a biological specific bond with the polyamide film to thereby realize more stable immobilization, thus being preferred.

The term "immobilize" or "to be immobilized" as used herein means to bind through a covalent bond.

The term "stably immobilize" as used herein means to bind with such strength that the substance is not washed away upon washing away an unreacted substance or in a washing step upon detecting the biochemical specific bond.

Whether the substance is immobilized or not can be measured by, for example, labeling the substance capable of forming a biochemical specific bond with a fluorescent dye and using a fluorescence scanner.

The density of the substance capable of forming a biochemical specific bond after immobilization is preferably from $10^{-13}$ to $10^{-5}$ mol/$cm^2$.

Upon immobilization by reacting the substance capable of forming a biochemical specific bond with the functional group-introduced polyamide film, contact between the functional group-having substance capable of forming a biochemical specific bond with the functional group-introduced polyamide film is usually performed by spotting a buffer solution of the substance capable of forming a biochemical specific bond onto the surface of the functional group-introduced polyamide film. As the buffer solution, a citrate buffer solution, a phosphate buffer solution, a borate buffer solution and a tris buffer solution may be employed, with a phosphate buffer solution being particularly preferred. The concentration in the buffer solution of the substance capable of forming a biochemical specific bond to be spotted is preferably from 0.01 to 100 μmol/L, more preferably from 0.05 to 50 μm/L.

The pH of the buffer solution is preferably from 5 to 8.

Upon immobilization by reacting the substance capable of forming a biochemical specific bond with the functional group-introduced polyamide film, it is preferred to place the solution-spotted polyamide film in an atmosphere of from 20 to 60° C. in temperature.

The polyamide film obtained by the invention on which the substance capable of forming a biochemical bond is immobilized can be utilized for analysis of mutual action between nucleic acids, analysis of variation, analysis of polymorphism, analysis of mutual action between proteins, analysis of expression of a protein and study for developing a drug. As one embodiment of utilizing it, there are illustrated a biological material chip such as a DNA chip or a protein chip, and a microarray and a macroarray which, however, are not limitative at all.

In detection, the detection principle described in, for example, Sambrook et al., Molecular Cloning, 2001, CSHL Press. Generally, a reaction with a labeled nucleic acid or ligand is employed. As the labeling method, there are known an RI method and a non-RI method (a fluorescence-utilizing method, a biotin method or a chemically light-emitting method) which, however, are not limitative at all. In the case of, for example, the fluorescence-utilizing method, any substance that can bind with a base moiety of a nucleic acid or an amino acid residue of a protein may be used as a fluorescent substance for fluorescent labeling. A cyanine dye (e.g., commercially available Cy3 or Cy5 of Cy Dye™ series), Rhodamine 6G reagent, N-acetoxy-N2-acetylaminofluorene (AAF) or AAIF (iodine derivative of AAF) may be used.

Next, the invention is described in more detail by reference to Examples which, however, are not construed to limit the invention in any way.

Example 50 mL of anhydrous tetrahydrofuran was placed in a glass-made screwed bottle, and two sheets of 5-cm cut polyamide film (Biodyne A; manufactured by NIPPON Genetics Co., Ltd.) were dipped therein and, under stirring by means of a magnetic stirrer, 200 μL of 2-methacryloyloxyethyl isocyanate was added thereto, followed by stirring at 25° C. for 4 hours. Thereafter, the polyamide film having introduced thereonto the functional group was taken out and dried in a dark place for 17 hours. Further, an isotonic sodium chloride solution-phosphate buffer solution (pH: 7.4) containing 50 ∞mol/L of an amino group-introduced nucleic acid labeled with fluorescence (Cy5-GFP-NH$_2$) was spotted onto the polyamide film in an amount of 1 μL using a microsyringe in a dark place under an indirect illumination. The polyamide film was shielded from light by aluminum foil and allowed to stand for 24 hours while heating in a 60° C. warm air drier. After the heating, the film was dipped in 5 mL of an isotonic sodium chloride solution-phosphate buffer solution (pH: 7.4) and left for 24 hours at room temperature. The polyamide film was dipped in 5 mL of distilled water for 10 minutes, then again dipped in another 5 mL of distilled water for 10 minutes, followed by air-drying at room temperature. Analysis by means of a fluorescence scanner revealed that the oligonucleotide was immobilized in an amount of 36.1 pmol per cm$^2$.

The invention is useful for analysis of gene expression, variation and polymorphism or proteomix analysis, and can be utilized as a biological material chip such as a DNA chip or protein chip or as a microarray wherein a biochemical substance such as DNA or a protein is immobilized onto the polyamide solid phase.

The polyamide film obtained by the invention onto which a substance capable of forming a biochemical bond is immobilized can be utilized for analysis of mutual action between nucleic acids, analysis of variation, analysis of polymorphism, analysis of mutual action between proteins, analysis of protein expression and study on developing drugs.

According to the invention, there can be obtained a polyamide solid phase onto which a functional group for binding a biological material such as an oligonucleotide or a protein to the solid-phase substrate is introduced. Also, according to the invention, there can be provided a polyamide solid phase onto which a substance capable of forming a biochemical specific bond (biological material) is rapidly and stably bound and immobilized.

The entire disclosure of each and every foreign patent application from which the benefit of foreign priority has been claimed in the present application is incorporated herein by reference, as if fully set forth.

What is claimed is:

1. A (meth)acryloyl group-introduced polyamide solid phase comprising:
   a polyamide solid phase having an amido group; and
   an isocyanate compound represented by formula (I)

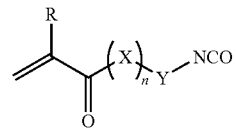

Formula (I)

wherein R represents a hydrogen atom or a methyl group;
X represents an oxygen atom or —NH—;
Y represents an optionally branched alkylene group containing from 1 to 6 carbon atoms; and
n represents an integer of 0 or 1,
wherein the (meth)acryloyl of the isocyanate compound is introduced onto a surface of the polyamide solid phase by reacting the amido group of the polyamide solid phase with the isocyanate group of the isocyanate compound.

2. The (meth)acryloyl group-introduced polyamide solid phase according to claim 1,
wherein R represents a methyl group;
X represents an oxygen atom;
Y represents an ethylene group; and
n represents 1.

3. The (meth)acryloyl group-introduced polyamide solid phase according to claim 1, wherein the polyamide solid phase is in a film form.

* * * * *